United States Patent
Rahai et al.

(10) Patent No.: US 7,393,177 B2
(45) Date of Patent: Jul. 1, 2008

(54) VERTICAL AXIS WIND TURBINE WITH OPTIMIZED BLADE PROFILE

(76) Inventors: Hamid R. Rahai, 6223 Seville Ct., Long Beach, CA (US) 90803; Hamid Hefazi, 2 Crestwood, Irvine, CA (US) 92620

(*) Notice: Subject to any disclaimer, the term of this patent is extended or adjusted under 35 U.S.C. 154(b) by 86 days.

(21) Appl. No.: 11/267,363

(22) Filed: Nov. 4, 2005

(65) Prior Publication Data

US 2007/0104582 A1     May 10, 2007

(51) Int. Cl.
 *F03D 3/06* (2006.01)
(52) U.S. Cl. .................. 415/4.2; 415/905; 415/907; 416/DIG. 2; 416/DIG. 9
(58) Field of Classification Search .................. 415/4.1, 415/4.2, 4.3, 4.4, 4.5, 905, 907, 122.1; 416/197 A, 416/243, DIG. 2, DIG. 9, 170 R
See application file for complete search history.

(56) References Cited

U.S. PATENT DOCUMENTS

| | | | |
|---|---|---|---|
| 1,467,699 A * | 9/1923 | Povl | 416/226 |
| 1,473,066 A * | 11/1923 | Wells | 416/235 |
| 3,918,839 A | 11/1975 | Blackwell et al. | |
| 4,082,479 A | 4/1978 | Rangi et al. | |
| 4,293,274 A | 10/1981 | Gilman | |
| 4,331,881 A * | 5/1982 | Soderholm et al. | 290/44 |
| 4,359,311 A | 11/1982 | Benesh | |
| 4,362,470 A | 12/1982 | Locastro et al. | |
| 4,500,257 A | 2/1985 | Sullivan | |
| 4,641,796 A * | 2/1987 | Feifel | 244/123.7 |
| 4,684,324 A * | 8/1987 | Perosino | 416/189 |
| 4,808,074 A | 2/1989 | South | |
| 4,830,570 A | 5/1989 | Benesh | |
| 4,838,757 A | 6/1989 | Benesh | |
| 5,076,759 A | 12/1991 | Schönell | |
| 5,252,029 A | 10/1993 | Barnes | |
| 5,375,324 A | 12/1994 | Wallace et al. | |
| 5,405,246 A | 4/1995 | Goldberg | |
| 5,494,407 A | 2/1996 | Benesh | |
| 5,499,904 A | 3/1996 | Wallace et al. | |
| 5,575,624 A * | 11/1996 | Bogage | 416/242 |
| 6,428,275 B1 | 8/2002 | Jaakkola | |
| 6,666,650 B1 * | 12/2003 | Themel | 416/200 R |
| 6,682,302 B2 | 1/2004 | Noble | |
| 6,688,842 B2 | 2/2004 | Boatner | |
| 6,740,989 B2 | 5/2004 | Rowe | |
| 6,948,910 B2 | 9/2005 | Polacsek | |

* cited by examiner

*Primary Examiner*—Igor Kershteyn
(74) *Attorney, Agent, or Firm*—Fulwider Patton LLP (57) ABSTRACT

A high efficiency vertical axis wind turbine includes an optimized blade shape for increased torque output. The shape of the optimized profile includes a camber portion at a leading edge region of the blade with a maximum height to chord ratio (Y/C) at when the non-dimensional chord length (X/C) is approximately one third. An intermediate region follows the leading edge region and is characterized by a shallow convex region, followed by a flow reattachment surface at the trailing edge region characterized by a second concave region and a local maximum of the height to chord ratio at approximately four fifths of the non-dimensional chord length.

13 Claims, 9 Drawing Sheets

FIG. 1

(Prior Art)

FIG. 2

(Prior Art)

(a) (abscissa is # of iterations performed before convergence)

VERTICAL AXIS WIND TURBINE WITH OPTIMIZED BLADE PROFILE

FIELD OF THE INVENTION

The present invention relates generally to wind turbines, and more particularly to a vertical axis wind turbine with an asymmetric blade optimized by computational fluid dynamics analysis to improve torque and power output.

BACKGROUND OF THE INVENTION

Wind turbines are well known in the art for low cost power generation in areas of relatively consistent wind. Other than moderate noise pollution, these wind turbines are pollution free and have relatively low operating costs. However, the present wind turbines can have a high initial investment cost, and their performance can vary depending on wind direction and guidance machinery to maintain the turbine in position for maximum power output.

Figure 1:
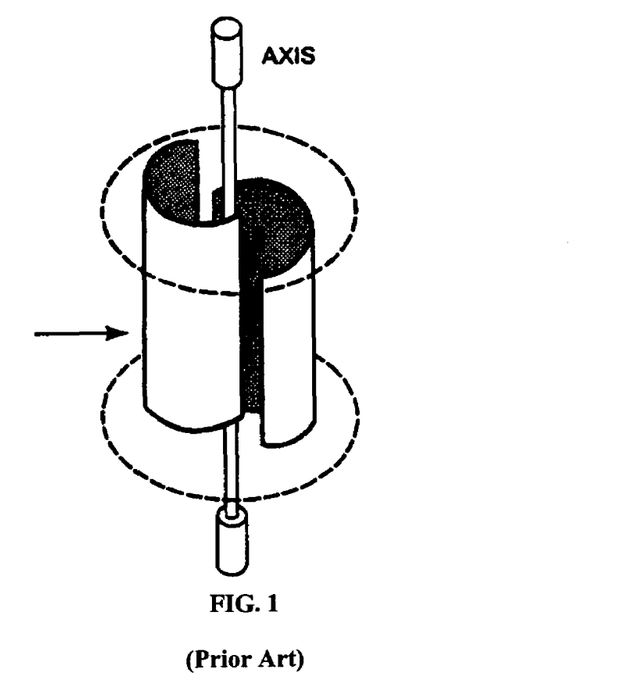
FIG. 1 is a perspective view of a prior art vertical axis wind turbine.
Figure 2:
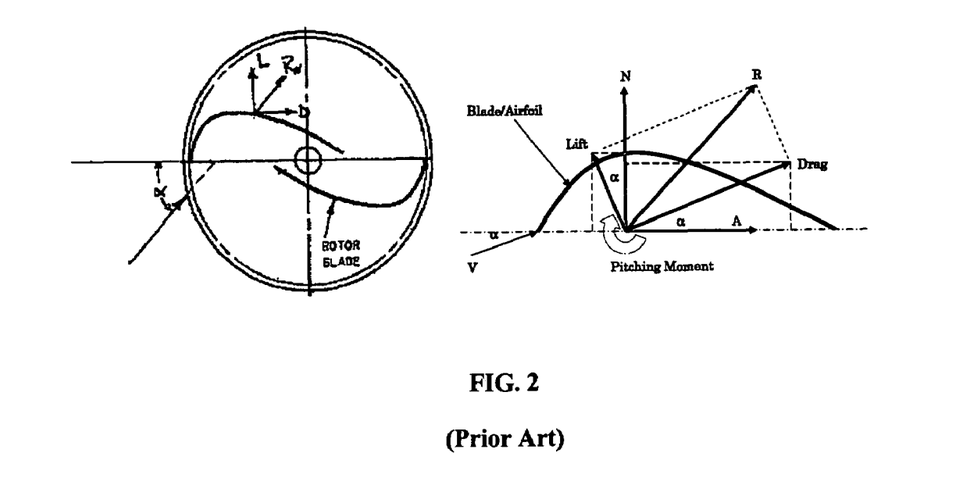
FIG. 2 is a cross sectional view of a Benesh-type wind turbine blade configuration.

Wind turbines comprise two general types, horizontal axis and vertical axis. The vertical axis wind turbine is the simplest design, and one predominant vertical axis wind turbine is commonly referred to as a Savonius wind turbine. Savonius-type wind turbines are well known in the art. Examples are illustrated in U.S. Pat. No. 4,784,568, U.S. Pat. No. 4,359,311, and U.S. Pat. No. 5,494,407. The rotor blades or vanes are traditionally semi-cylindrical shaped and coupled to a central shaft. FIG. 1 illustrates a perspective view of a traditional Savonius vertical axis wind turbine and FIG. 2 illustrates a cross section of a vertical axis wind turbine with Benesh airfoils. The principle of operation of Savonius wind turbine machine is based on the difference in the drag forces of semi-circular vanes extending horizontally on a rotor, where one semi-circular vane is oriented so as to be concave while the counterpart vane is oriented to be convex. When placed in an air stream, the drag difference between the concave vane and the convex vane causes the rotor to rotate. Advantages of this type of machine are that it is self-starting, does not require aiming into an incident wind direction, is simple to design, and has low construction cost. However, previous extensive experimental studies have shown that it has relatively low efficiency.

SUMMARY OF THE INVENTION

The present invention comprises a higher efficiency vertical axis wind turbine than vertical axis wind turbines with traditional blade profiles, where the improvement lies with an optimized blade shape for increased torque output. The blade shape was developed using a Computational Fluid Dynamic (CFD) code along with various objective functions and an optimizer routine to modify a baseline shape. The result is a blade shape that produces a higher torque for vertical axis wind turbines than conventional blade shapes. The shape of the optimized profile includes a camber portion at a leading edge region of the blade with a maximum height to chord ratio (Y/C) at when the non-dimensional chord length (X/C) is approximately one third. An intermediate region follows the leading edge region and is characterized by a shallow convex region, followed by a flow reattachment surface at the trailing edge region characterized by a second concave region and a local maximum of the height to chord ratio at approximately four fifths of the non-dimensional chord length. Experimental testing of the improved blade shape showed an improvement of nearly 17% and 40% in the power coefficient with and without span-wise slots respectively for a zero overlap condition, and a mean velocity of 6.8 m/sec. For both single and two-blade configurations with the improved geometry, testing showed nearly 27% improvement in the torque coefficient.

Other features and advantages of the invention will become apparent from the following detailed description, taken in conjunction with the accompanying drawings which illustrate, by way of example, the features of the invention

DETAILED DESCRIPTION OF THE INVENTION

Figure 3:
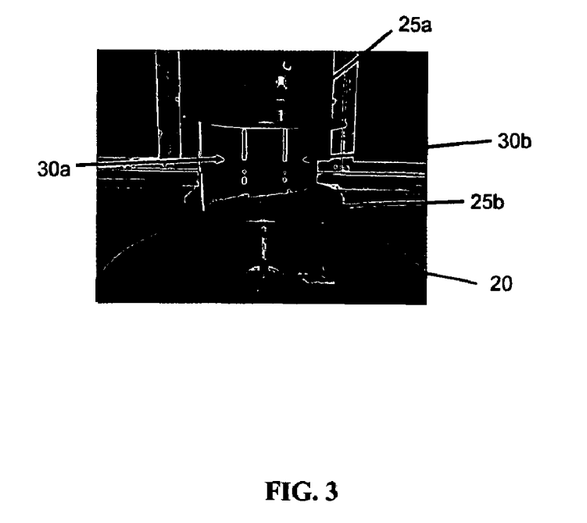
FIG. 3 is a perspective view of a wind turbine blade configuration according to a preferred embodiment of the present invention.

The construction and operation of the Savonius wind turbine is well known in the art, and is illustrated for example in U.S. Pat. No. 4,784,568, incorporated herein by reference. FIG. 3 illustrates a vertical shaft or axis 20 about which two blades or vanes 30a,b are coupled such that their respective curvatures are oriented approximately 180 degrees apart. The blades 30a,b are mounted between two circular disks 25a,b. The entire structure shown in FIG. 2 can be enclosed in a frame as described in U.S. Pat. No. 4,362,470 the contents of which are fully incorporated herein by reference. The wind turbine includes a transmission such as a pulley and belt mounted on the shaft 20 and also coupled to the shaft of a generator (not shown) or other power converting means as is customary in the art.

Returning to FIG. 2, the cross section of the simplified turbine illustrates resultant lift and drag forces (L and D, respectively) and their resultant force R acting on the surface of the blade for a given angle of attack α. If the resultant force on one blade is greater than the resultant force on the second blade, a net force resolved tangentially to the shaft 20 supplies the torque that drives the turbine. The greater the difference between the resultant forces, the higher the torque. Thus, it is imperative to optimize the difference in the resultant lift and drag forces between the convex blade and the concave blade with reference to the freestream airflow.

Figure 4:
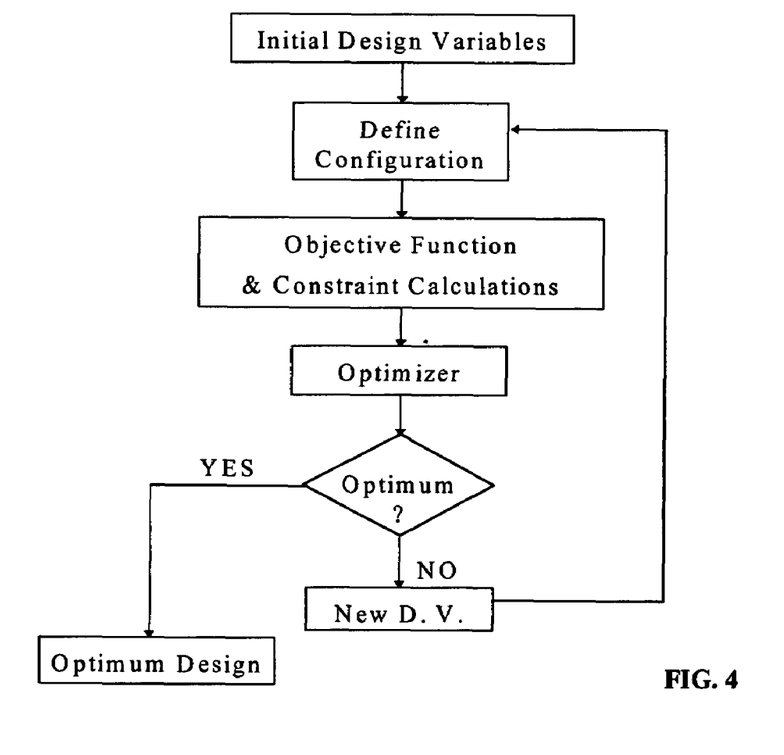
FIG. 4 is a flow chart describing the optimization process.

The present invention was developed taking advantage of numerical optimization to improve the geometry of a vertical axis airfoil for higher torque, which in turn produces higher power. The aerodynamic optimization included three phases. First, a baseline geometric configuration was determined and parameterized, and a method of geometric manipulation was chosen. Second, the aerodynamic performance was evaluated, and then in the third phase an appropriate optimization scheme was selected to obtain a desired solution. The overall optimization method is illustrated in FIG. 4. An initial set of values for the design variables, which in this case correspond to the baseline design, is used in a first step to define an initial configuration in step two. For this configuration, a prescribed objective function is evaluated in step three and the constraints are analyzed to determine whether they are violated. The optimizer then determines in step four if the design is optimal and, if so, outputs the design variables and the process terminates. If not, the optimizer modifies the design variables in step six which are then fed back to generate a new configuration at step two. This process is repeated until an optimum design is obtained.

The numerical optimization of a single turbine blade is initiated with the generation of a suitable high quality body fitted grid. Generation of such a grid can be accomplished in several ways. In the present invention, the grid is generated using the HEXA meshing module of the ICEMCFD software. This software allows for greater control of the grid meshing parameters, including the features that are required for the perturbation phase of the process. The baseline blade profile chosen here is the Benesh airfoil. The camber of the blade is approximated by the following equations.

$$y = \frac{m}{p^2}(2px - x^2) \quad 0 \leq x \leq 0.3$$

$$y = \frac{m}{(1-p)^2}((1-2p) + 2px - x^2) \quad 0.3 \leq x \leq 1.0$$

where m=p=0.3.

To obtain the most accurate CFD results, a small thickness is distributed along the camber line. The performance of the airfoil is not expected to change significantly with a small thickness (2-3%). A thin profile is therefore generated by applying a constant thickness of t=3% around camber line between $0 \leq x \leq 0.3$ and a tapered thickness to a closed trailing edge from x=0.3. The process is described by the following equations:

For $0 \leq x \leq 0.3$, $$x_u = x - 0.5t \sin \theta \quad y_u = y + 0.5t \cos \theta$$

$$x_l = x + 0.5t \sin \theta \quad y_l = y - 0.5t \cos \theta$$

For, $0.3 \leq x \leq 1.0$ $$y_t = \frac{t}{0.2}\left(ax^{\frac{1}{2}} + bx + cx^2 + dx^3 + ex^4\right)$$

a=0.2969, b=−0.126, c=−0.3516, d=0.2843, e=−0.1015

$$x_u = x - 0.5 y_t \sin \theta \quad y_u = y + 0.5 y_t \cos \theta$$

$$x_l = x + 0.5 y_t \sin \theta \quad y_l = y - 0.5 y_t \cos \theta$$

where $$\theta = \tan^{-1}\left(\frac{dy}{dx}\right) \text{ and}$$

the subscripts u and l denote upper and lower surfaces of the blade.

To avoid computational and gird generation difficulties associated with blunt leading edges, the profile is rounded by fitting a semi-circle between the points $$\left(-\frac{t}{\sqrt{5}}, \frac{t}{2\sqrt{5}}\right) \text{ and } \left(\frac{t}{\sqrt{5}}, -\frac{t}{2\sqrt{5}}\right).$$

The flow parameters were computed using the anticipated operational conditions of the blade for generation of about 1 KW of power. Nominal wind velocity is set at 10 m/s. The chord length of the full-scale blade is 1.8 meters. At standard atmospheric conditions, this translates to a Reynolds number based on the chord length of $1.233 \times 10^6$.

In this optimization process, a general parametric description of the baseline configuration is perturbed using a linear combination of appropriate shape functions. In the present case the Hicks-Henne shape functions are selected. They have the advantage of being space-based functions as opposed to frequency-based functions and allow for greater local control of the design.

General shape definition for this optimization is given as:

$$y(\overline{x}) = y_o(\overline{x}) + \sum_{i=1}^{S} x_i f_i(\overline{x})$$

where $\overline{x}$ is the coordinate along the airfoil blade, $y_o$ is the y coordinate of the baseline blade, $(x_i)_{1 \leq i \leq S}$ are the design variables, and $(f_i)_{1 \leq i \leq S}$ are the Hicks-Henne functions. The Hicks-Henne shape functions are given by $$f_i = \sin\left(\pi x^{\frac{\ln(0.5)}{\ln(a)}}\right)^b$$

where a and b control the center and thickness of the perturbation, and x is the normalized coordinate along the chord.

In the aerodynamic optimization process, there is a need to modify the grid around the object undergoing a geometric modification. A multi-zonal grid is used and the zones that require deformations are oriented such that in any zone this is the only surface that will undergo deformation. An algebraic method is well suited for this type of grid in that the displacements applied can be interpolated within each zone thus insuring zonal compatibility. It also allows the quality of the original grid to be preserved. It is independent from the grid generation process and can be applied to grids generated by any method. In this case, the mesh generation package ICEM/

Figure 5:
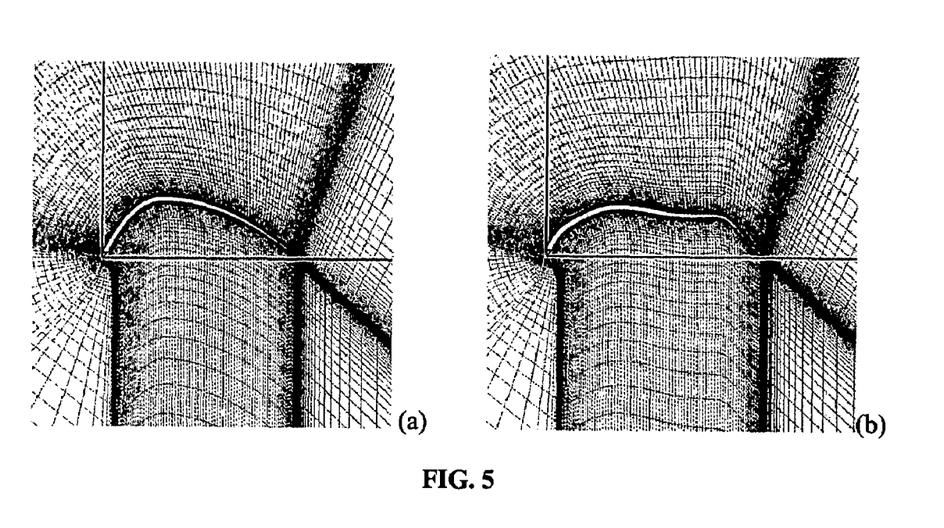
FIG. 5 is a zonal scheme for a baseline blade profile and an optimized blade profile.

CFD was used. FIG. 5a and 5b illustrates zones for the baseline blade grid and the optimized blade grid, respectively.

A non-linear Sequential Quadratic Programming scheme as implemented in I-Sight is used as the optimization scheme. The technique assumes that the objective function and constraints are continuously differentiable. It generates a sequence of quadratic programming sub-problems, obtained by a quadratic approximation of the Lagrangian function, and a linearization of the constraints. Second order information is updated by a quasi-Newtonian formula, and the method is stabilized by an additional line search. This type of optimization is a "sub-problem" type method that is particularly suited for problems with many variables. The method solves a series of approximations to the following non-linear programming problem:

$$\text{minimize/maximize } F(x)$$

$$\text{subject to } l \leq \begin{Bmatrix} x \\ Ax \\ c(x) \end{Bmatrix} \leq u$$

where $F(x)$ is the objective function, x is the vector that contains the design variables, $\{c(x)\}$ contains the nonlinear constraints, and $Ax$ contains the linear constraint matrix. These are subjected to their corresponding lower and upper bounds contained in the vectors l and u. The method employs a nonlinear programming algorithm to search for the minimum/maximum of the objective function. Each "iteration" of the optimization consists of the following two steps. First, the solution of the nonlinear programming problem is obtained and is defined as the search direction. When this direction is determined, a line search is applied to locate a local minimum or a maximum.

For purposes of the present invention, the quantity to be maximized is the torque. Angles of attack that provide the most contribution from lift to the torque are considered. Four angles in the vicinity of the ideal angle of attack are analyzed. The aerodynamic coefficients obtained by the flow solver are used to obtain an average torque coefficient for the angles under consideration. This is defined as the objective function to be optimized. Constraints on the design variables are placed to ensure a smooth blade profile.

The initial values of the design variables are set at 0.0, which correspond to the unperturbed baseline blade. For each iteration of the optimization, flow field solution as well as aerodynamic coefficients are computed and analyzed. The objective function of the optimization, i.e. the torque coefficient, is then computed. The aerodynamic coefficients, of lift and drag and pitching moment about the quarter chord are calculated by INS2D.

The following data points for the optimized blade was generated using the method described above:

| X/C | Y/C |
|---|---|
| 1 | 0 |
| 0.95 | 0.04346 |
| 0.9 | 0.09782 |
| 0.85 | 0.15617 |
| 0.825 | 0.17662 |
| 0.8 | 0.18599 |
| 0.775 | 0.19147 |
| 0.75 | 0.19072 |
| 0.7 | 0.19156 |
| 0.65 | 0.19109 |
| 0.6 | 0.19462 |
| 0.575 | 0.19657 |
| 0.55 | 0.20162 |
| 0.5 | 0.2115 |
| 0.45 | 0.2211 |
| 0.4 | 0.2289 |
| 0.35 | 0.23344 |
| 0.3 | 0.23224 |
| 0.25 | 0.22546 |
| 0.2 | 0.20547 |
| 0.15 | 0.17996 |
| 0.1 | 0.15009 |
| 0.05 | 0.1083 |
| 0.025 | 0.07635 |
| 0.0125 | 0.05353 |
| 0 | 0.01814 |
| 0 | 0.01016 |
| 0.0125 | 0 |

Figure 6:
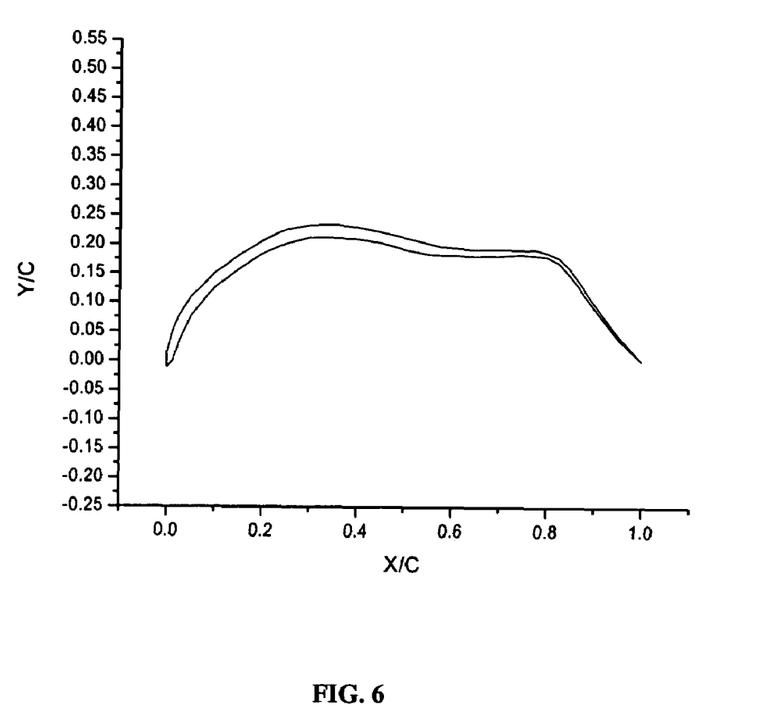
FIG. 6 is a plot of an optimized blade profile for the vertical axis wind turbine of the present invention.

A plot of these data points is shown in FIG. 6. The shape of the optimized profile as shown in FIG. 6 includes a camber portion at a leading edge region of the blade with a maximum height to chord ratio (Y/C) at when the non-dimensional chord length (X/C) is approximately one third. An intermediate region follows the leading edge region and is characterized by a shallow convex region, followed by a flow reattachment surface at the trailing edge region characterized by a second concave region and a local maximum of the height to chord ratio at approximately four fifths of the non-dimensional chord length.

Figure 7:
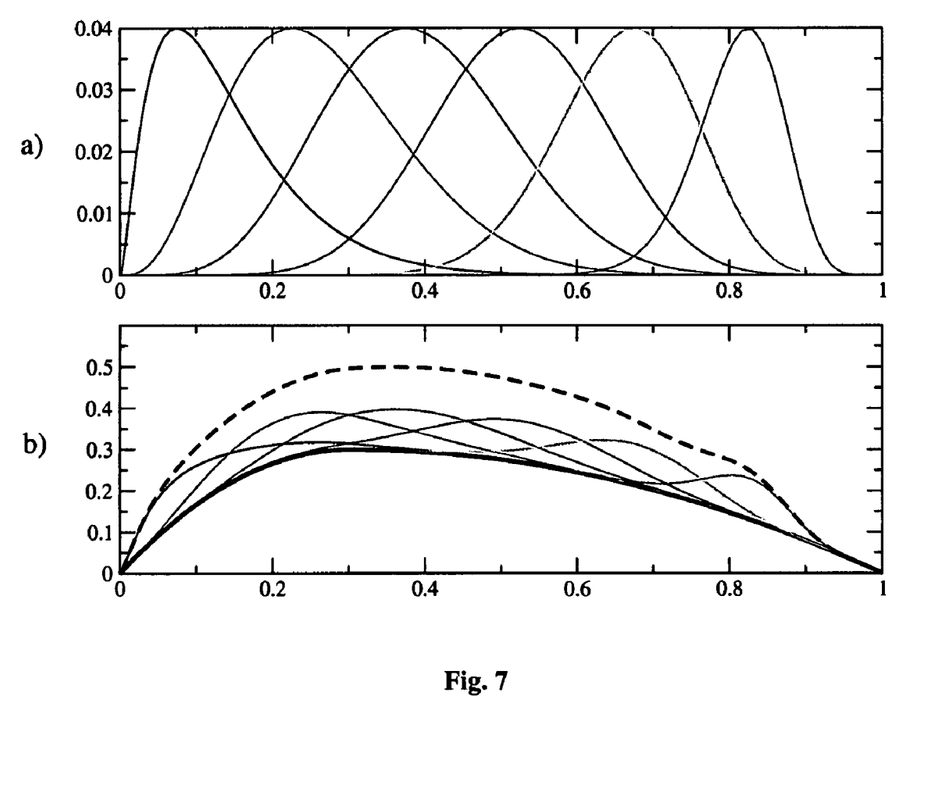
FIG. 7 is a plot of the Hicks-Henne functions and their effect on the baseline blade profile.

Hicks-Henne functions are illustrated in FIG. 7. The baseline shape (bottom graph) is plotted against shapes that have been modified by the corresponding Hicks-Henne function (top graph). The final shape is the linear combination shown by the dotted line.

Figure 8:
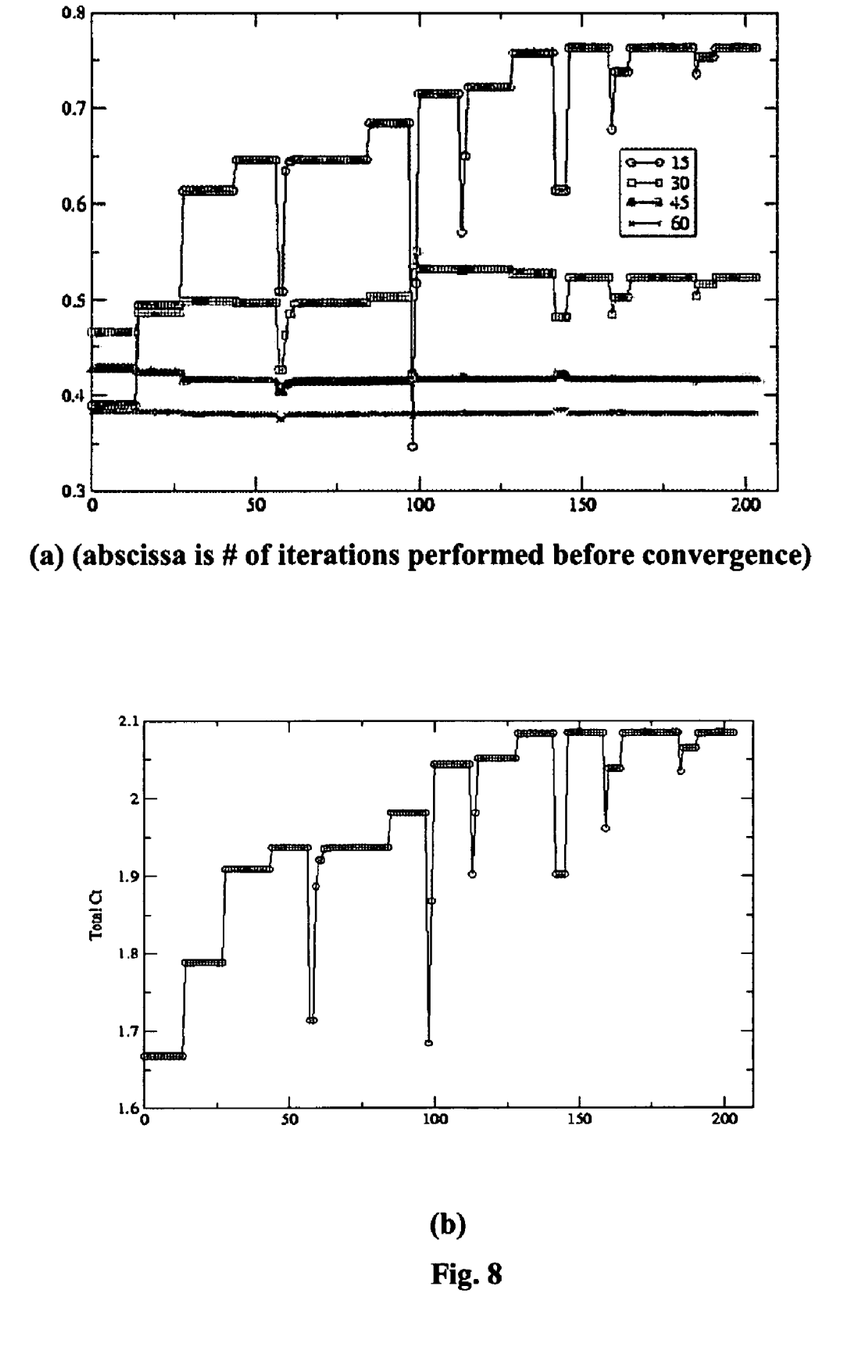
FIG. 8 is a graph of torque coefficients for four angles of attack.
Figure 9:
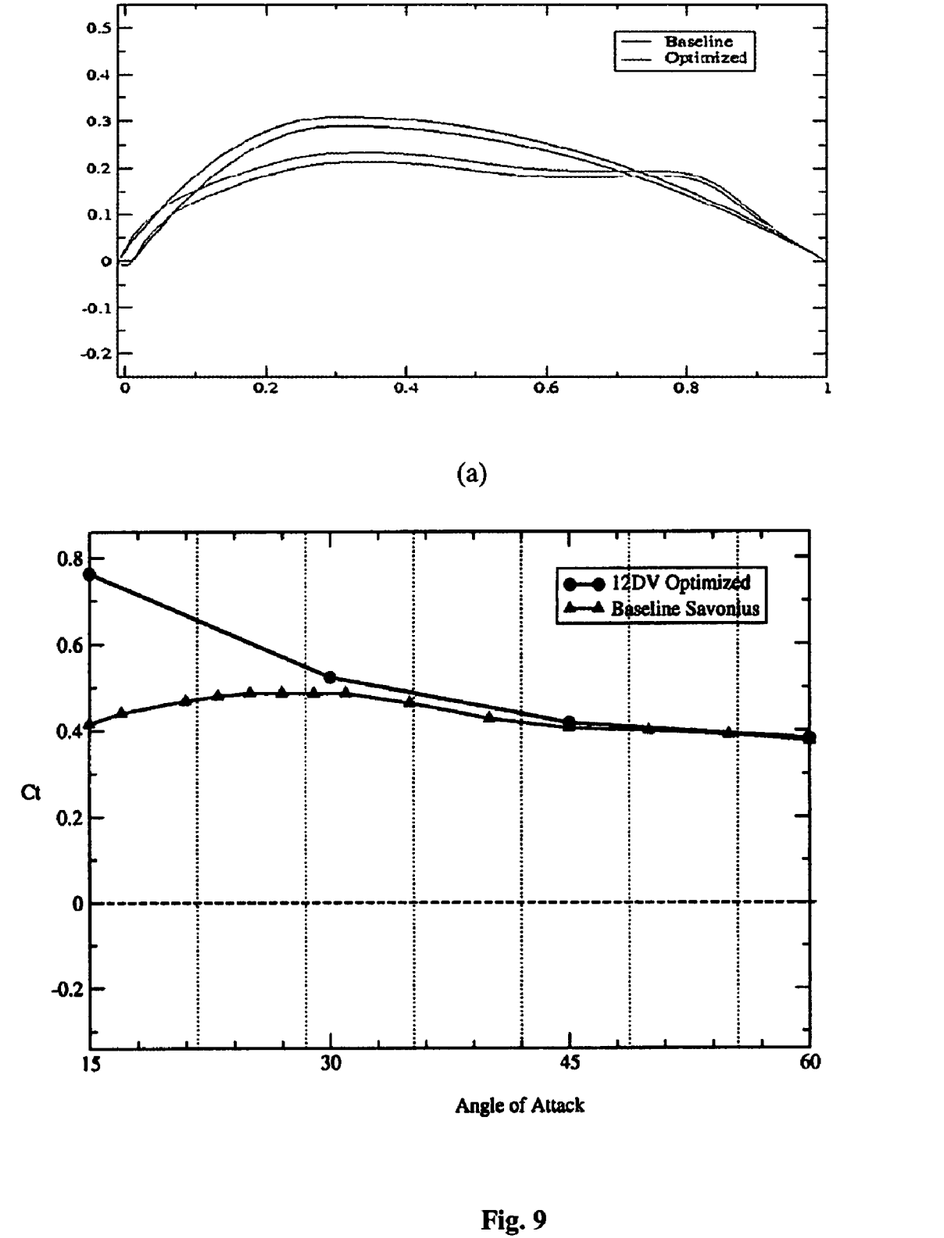
FIG. 9 is a plot of the angle of attack versus lift coefficient for the baseline and optimized blade profile.

Examination of the lift contribution for 4 angles of attack in 15-degree increments is performed to evaluate the overall effect of the optimization. The lift contribution of the blade is increased significantly in the 0-45 degrees range. For other regions the flow is almost fully separated and is thus shape-independent, and the contribution from lift is negligible even for the optimized blade. When the torque coefficients at 4 different angles of attack are compared with the plot of total torque coefficient as shown in FIG. 8, they show dependence on the angle of attack. The torque coefficients also show a greater dependence when they are small and the lift curve in the region is linear. As FIG. 9 shows, the contribution of lift decreases steadily as the angle of attack increases. This trend is observed for both the optimized and the baseline blades, which is an indication of the independence of the lift contribution from the geometry at high angles of attack. This validates the initial decision to concentrate on the ideal angles of attack.

Figure 10:
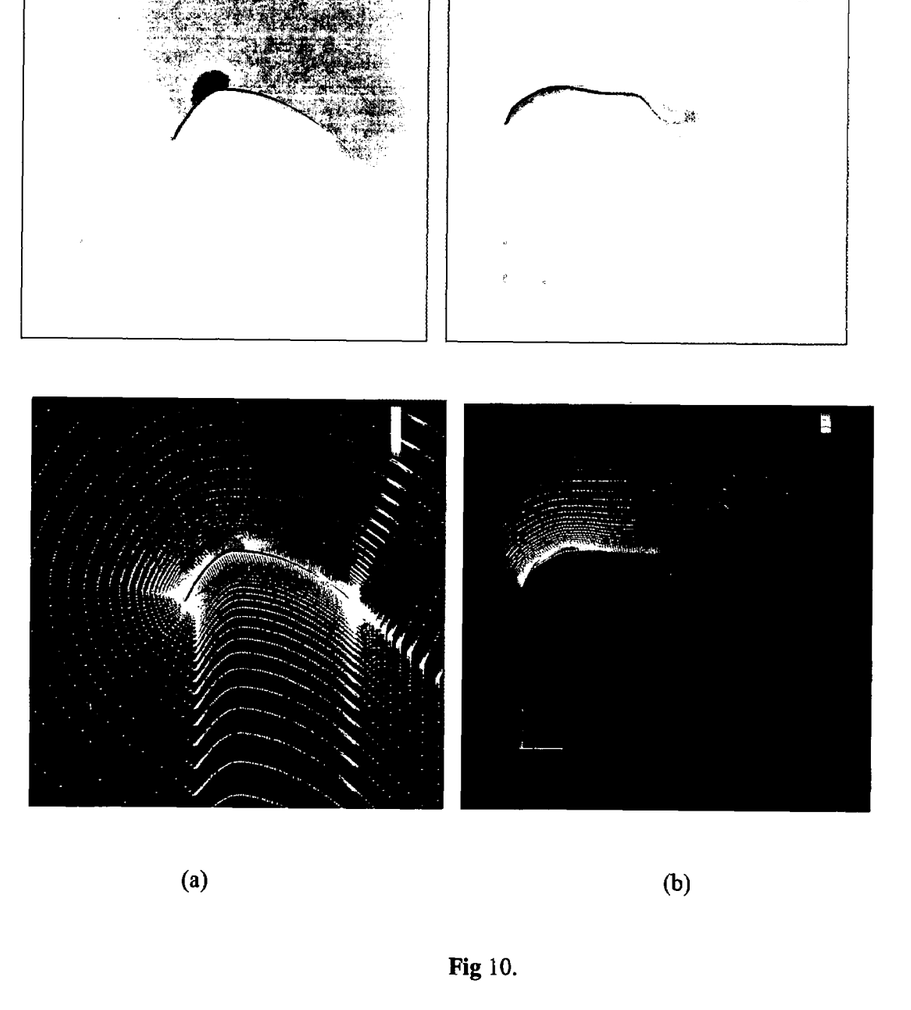
FIG. 10 is a plot of velocity and vector contours for the baseline configuration and the optimized blade profile at fifteen degrees angle of attack.

The mean velocity contours for both the baseline and the optimized blades are plotted for 15 degrees angle of attack in FIG. 10. For the baseline blade, the results show a very large region of flow separation and re-circulation just aft of the maximum camber location, which results in a large momentum loss during its operation even at this modest angle of attack. Flow on the lower surface of the blade separates almost immediately beyond the leading edge creating a region of re-circulation that encompasses almost the entire lower surface. Also, there is a small separated region on the upper surface of the blade near the leading edge, but the flow quickly reattaches after that.

For the optimized blade, the area of flow separation has diminished substantially in both the upper and lower surfaces. There is no separation bubble on the upper surface and the reduced camber and the flattened top portion help to sustain an attached shear layer. Toward the rear third of the blade, flow separates briefly, but a slight increase in the convexity of the blade allows reattachment. This particular shape is just one of the possibilities. The average torque coefficient, Ct, for four angles of attack for the baseline blade is 0.4167. The corresponding average coefficient for the optimized blade is 0.5211, an improvement of 23% over the baseline.

Figure 11:
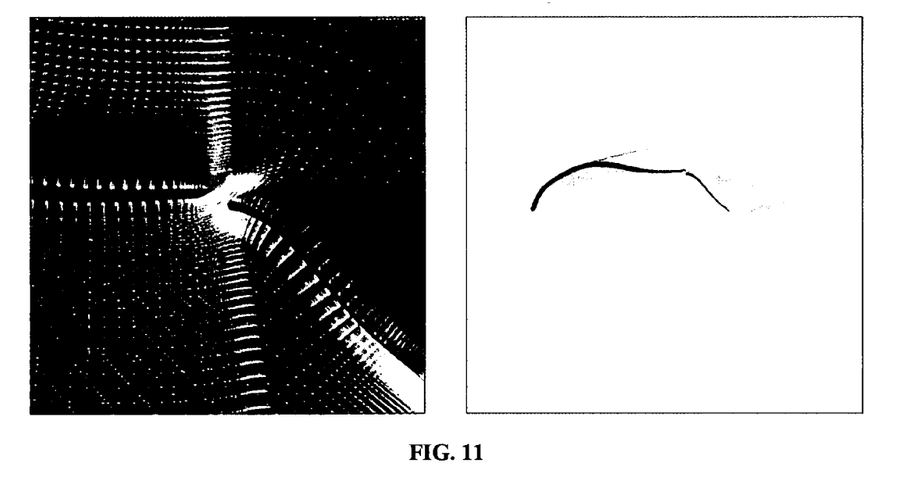
FIG. 11 is a plot of velocity and vector contours for the optimized blade with a spanwise slot at fifteen degrees angle of attack.

FIG. 11 shows the mean velocity contours for the two blade optimized configuration at 48% overlap. Flow accelerates over and through the blades with large area of separation within the blades, near their surfaces. The separation area is higher for the lower blade than the upper one. There are also separated flow regions on the outside surfaces near the blades trailing edges. These results indicate that the high overlap region between the blades actually will induce more separation region and should not increase the overall efficiency of the two-blade configuration significantly.

Figure 12:
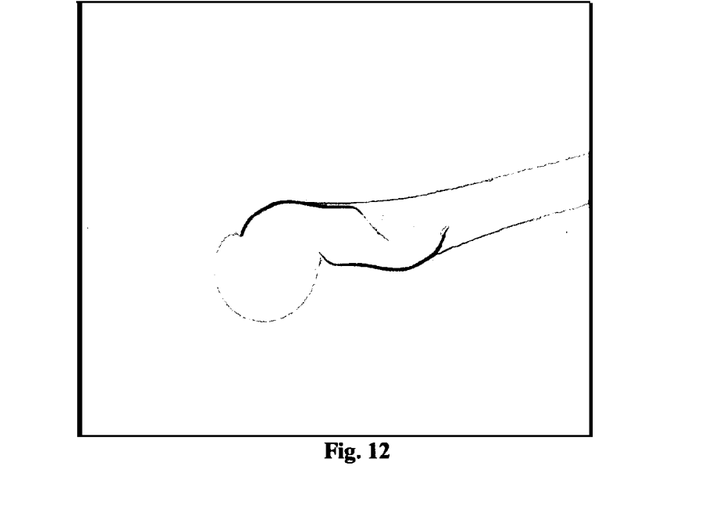
FIG. 12 is a plot of velocity contours for a two-blade system at fifteen degrees angle of attack.

FIG. 12 shows the mean velocity contours for the two optimized blades configured with 48% overlap. Flow accelerates over and through the blades with large area of separation within the blades, near their surfaces. The separation area is higher for the lower blade than the upper one. There are also separated flow regions on the outside surfaces near the blades trailing edges. These results indicate that the high overlap region between the blades actually will induce more separation region and should not increase the overall efficiency of the two-blade configuration significantly.

The results of the numerical studies indicate that the optimized single blade should produce higher torque than the baseline blade. However, the presence of a spanwise slot results in larger flow separation regions and loss of momentum that results in a reduced torque and lower performance. For the optimized two-blade configuration with the large overlap the flow does not completely encompass the whole blades as it did for the single blade and thus should not have significant improvements in the overall drag force. For the two-blade configuration, improvement occurs when the overlap percentage is significantly reduced.

Experimental assessments of the numerical optimization were performed in a low speed wind tunnel having a cross section working area of 90×120 cm and is 300 cm long. The turbine blades were built according to the optimized geometry with a Laminate Object Machine, which is capable of fabricating objects with different contours from a CAD solid model, or shaped from brown foam with fiberglass coating. Four blades were made using the optimized geometry at 28 cm chord length and 22 cm width. For determining the effect of a spanwise slot, two of the blades had spanwise slots of 0.635 cm in width and 20 cm in length at 75% of the chord.

For the wind tunnel evaluation, a turbine was constructed with two blades constrained between two round plates of 45 and 60 cm diameter. The 45 cm diameter plates were used for an overlap ratio of 48% and the 60 cm diameter plates were used when the overlap ratio was zero. A round shaft of approximately 1.58 cm diameter at the mid point connect the assembly to a bearing and pulley outside the wind tunnel. Direct torque measurements were performed with a Lab-Volt electric dynamometer, which has a range of 0-27 inch-lbf. The dynamometer was connected to the shaft of the wind turbine via a belt-pulley arrangement outside the wind tunnel. The rotation speed (rpm) was measured using a Lab-Volt tachometer model EMS 8931-00 with an output range of 2 volts/1000 rpm which was attached to the shaft directly.

The bearing friction force, or the start up force for the whole assembly is measured using a nylon chord fixed to the pulley. After winding the chord around the pulley, weights are added to the free end of the chord incrementally until it starts to rotate. The total weight represents the friction force to initiate the turbine blades turning. The torque is calculated by multiplying the friction force by the pulley's radius. The friction force is measured for each configuration tested. The torque and rotation speed are measured at three free stream mean velocities of 6.8, 8, and 9.75 m/sec, which correspond to Reynolds numbers based on cord length of $12.25 \times 10^4$, $14.4 \times 10^4$, $17.6 \times 10^4$ respectively. The testing is performed for blades at zero and 48% overlap conditions. The gap between the blades is zero.

Figure 13:
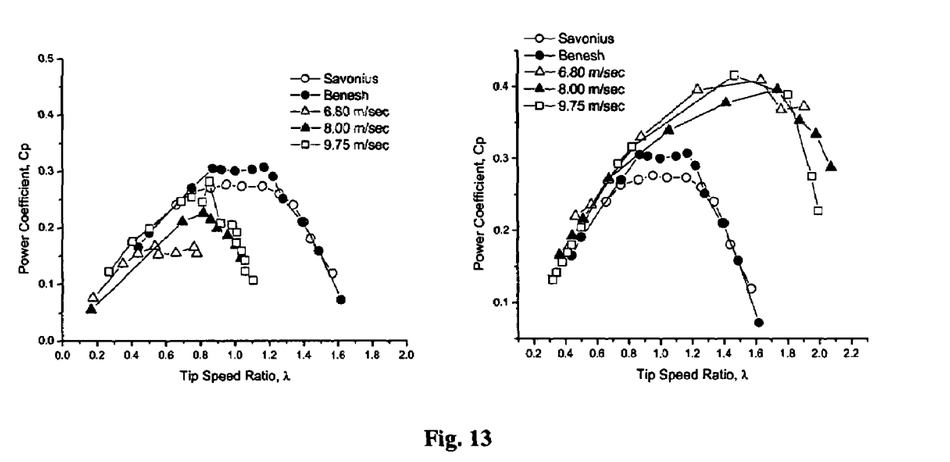
FIG. 13 is a plot of the variation of power coefficient at different velocities for blades without a spanwise slot at zero and 48% blade overlap.
Figure 14:
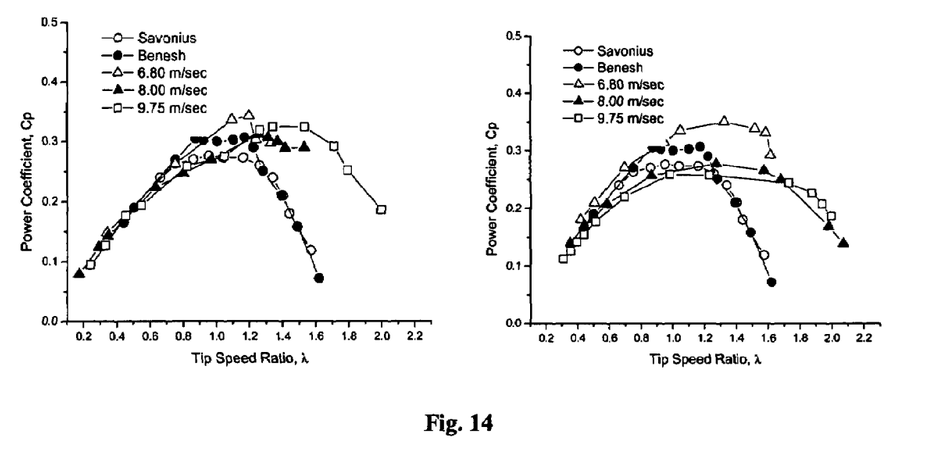
FIG. 14 is a plot of the variation of power coefficient at different velocities for blades with a spanwise slot at zero and 48% blade overlap.

FIGS. 13 and 14 show variation of the power coefficient for the optimized two-blade configuration with and without the spanwise slots at zero and 48% overlap conditions for the three free stream velocities of 6.8, 8.0 and 9.75 m/sec. The figures also include the corresponding results for the Savonius and Benesh airfoils tested under similar conditions taken from the results of Moutsoglou and Weng, 1995, "Performance Tests of a Benesh Wind Turbine Rotor and a Savonius Rotor," Wind Engineering, Vol. 19, No. 6, 1995. For 48% overlap condition, the maximum power coefficients for the optimized blades are less than the corresponding values for the Savonius and Bensh airfoils. For the optimized blade, the maximum power coefficients are 0.15, 0.2, and 0.25 at about 0.8 tip speed ratio for the free stream mean velocities of 6.8, 8.0, and 9.75 m/sec, respectively. The Savonius and Benesh airfoils can sustain the maximum power coefficient for the tip speed ratio of approximately 0.8 to 1.2, while the corresponding range of the tip speed ratio for the optimized blade is at approximately 0.5 to 0.8 for the mean velocity of 6.8 m/sec and at 0.8 for the mean velocities of 8.0 and 9.75 m/sec.

The results are changed when the overlap ratio is reduced to zero. The maximum power coefficient for the optimized blade is more than 0.4 for the mean velocities of 6.8 and 9.75 m/sec and about 0.4 for the mean velocity of 8.0 m/sec. These values represent more than 30% improvement over the power coefficient of the Benesh airfoil. The rise in the power coefficients extends to a tip speed ratio of 1.6, before it starts to decrease. These results are consistent with our numerical analysis and indicate that the optimized blade can sustain power generation up to a much higher tip speed ratio than the Benesh or Savonius airfoils.

When spanwise slots are added for the 48% overlap condition, the increase in the power coefficient of the optimized blades is less significant. The maximum power coefficient for the optimized blade is approximately 0.33 for the mean velocities of 8.0 and 9.75 m/sec, representing less than 10% improvement. For the mean velocity of 6.8 m/sec, the maximum power coefficient is nearly the same as the corresponding value for the Benesh airfoil. Even though the increase in the power coefficient of the optimized blades with the spanwise slots is not significant, however, the range of power production still extends to the tip speed ratio of 1.6, much higher than the corresponding value for the Benesh or Savonius airfoil.

When the overlap ratio is reduced to zero, there is more than a 15% increase in the maximum power coefficient of the optimized blades as compared with the power coefficient of the Benesh airfoil at 6.8 m/sec. However, the power coefficient is reduced by nearly 13% at velocities of 8.0 and 9.75 m/s. These results indicate that for the optimized blade there is an extended range of speed for the power production, however, the presence of the slots increases the regions of flow separation, and thus results in reduction of power. These results are consistent with numerical analysis where more separation areas were observed on the top surface of the optimized blade with the slot in place.

Analysis shows that when the power coefficient is reduced the torque coefficient is reduced and vise versa. These results indicate that with the optimized blades at zero overlap condition and without the spanwise slots, there are significant increases in the torque coefficient at all speeds for the tip speed ratios higher than 1.0. This indicates that with proper design parameters, the optimized blades can continuously generate power up to much higher tip speed ratio than the high efficiency Benesh airfoil.

The testing verifies that the vertical axis wind turbines with improved blade configuration can generate electric power at relatively moderate wind speed with an efficiency that is nearly comparable with the horizontal axis wind turbines. The present invention is well suited for uses near beach areas where continuous moderate wind exists for most of the year. Other applications includes the top of the tall commercial and residential buildings where higher wind shear will produce nearly continuous power for most of the year. Other locations of generally continuous moderate wind conditions will benefit greatly from the present invention.

For example, the present invention would be well suited to generate electricity for lighting along the beaches in both public and private properties. It can particularly be advantageously used adjacent highways and freeways where the wind shear from passing cars and trucks will rotate series of turbines to generate electricity sufficient to power roadside lighting. It can also be advantageously employed to generate power for boats and RVs at moderate wind speeds in stationary condition. Overall, there are substantial savings and public benefits available from the present invention.

We claim:

1. A vertical axis wind turbine comprising:
a vertical shaft mounted for rotation about an axis;
an upper plate disposed perpendicular to said axis about said vertical shaft;
a lower plate disposed perpendicular to said axis about said vertical shaft;
a transmission coupled to said shaft; and
a plurality of blades disposed between said upper and lower plates, said blades having a an upper surface and a lower surface, said upper surface defining a camber portion at a leading edge region, a concave portion at an intermediate region, and a convex portion at a trailing edge.

2. The vertical axis wind turbine of claim 1 wherein said blade profile has a maximum height to chord ratio (Y/C) at approximately one third a non-dimensional chord length (X/C).

3. The vertical axis wind turbine of claim 1 wherein the blade profile has a local maximum height to chord ratio at approximately four fifths the non-dimensional chord length.

4. The vertical axis wind turbine of claim 1 wherein the concave portion at the trailing edge serves as a flow reattachment location for airflow separated at the intermediate region.

5. The vertical axis wind turbine of claim 1 wherein the non-dimensional height of the blade (Y/C) plotted against the non-dimensional length of the blade (X/C) is approximated by:

| X/C | Y/C |
|---|---|
| 1 | 0 |
| 0.95 | 0.04346 |
| 0.9 | 0.09782 |
| 0.85 | 0.15617 |
| 0.825 | 0.17662 |
| 0.8 | 0.18599 |
| 0.775 | 0.19147 |
| 0.75 | 0.19072 |
| 0.7 | 0.19156 |
| 0.65 | 0.19109 |
| 0.6 | 0.19462 |
| 0.575 | 0.19657 |
| 0.55 | 0.20162 |
| 0.5 | 0.2115 |
| 0.45 | 0.2211 |
| 0.4 | 0.2289 |
| 0.35 | 0.23344 |
| 0.3 | 0.23224 |
| 0.25 | 0.22546 |
| 0.2 | 0.20547 |
| 0.15 | 0.17996 |
| 0.1 | 0.15009 |
| 0.05 | 0.1083 |
| 0.025 | 0.07635 |
| 0.0125 | 0.05353 |
| 0 | 0.01814 |
| 0 | 0.01016 |
| 0.0125 | 0. |

6. The vertical axis wind turbine of claim 1 having two blades with a zero overlap between said two blades.

7. The vertical axis wind turbine of claim 1 wherein said turbine is a Savonius wind turbine.

8. The vertical axis wind turbine of claim 1 wherein said upper plate and lower plate each comprises a circular disk.

9. A blade for a vertical axis wind turbine comprising:
a solid body having an upper surface and a lower surface, said upper surface defining a camber portion at a leading edge region, a concave portion at an intermediate region, and a convex portion at a trailing edge.

10. The blade for a vertical axis wind turbine of claim 9 wherein said blade has a maximum height to chord ratio (Y/C) at approximately one third a non-dimensional chord length (X/C).

11. The blade for a vertical axis wind turbine of claim 9 wherein the blade has a local maximum height to chord ratio at approximately four fifths the non-dimensional chord length.

12. The blade for a vertical axis wind turbine of claim 9 wherein the concave portion at the trailing edge serves as a flow reattachment location for airflow separated at the intermediate region.

13. The vertical axis wind turbine of claim 9 wherein the non-dimensional height of the blade (Y/C) plotted against the non-dimensional length of the blade (X/C) is approximated by:

| X/C | Y/C |
|---|---|
| 1 | 0 |
| 0.95 | 0.04346 |
| 0.9 | 0.09782 |
| 0.85 | 0.15617 |
| 0.825 | 0.17662 |
| 0.8 | 0.18599 |
| 0.775 | 0.19147 |
| 0.75 | 0.19072 |

| X/C | Y/C |
|---|---|
| 0.7 | 0.19156 |
| 0.65 | 0.19109 |
| 0.6 | 0.19462 |
| 0.575 | 0.19657 |
| 0.55 | 0.20162 |
| 0.5 | 0.2115 |
| 0.45 | 0.2211 |
| 0.4 | 0.2289 |
| 0.35 | 0.23344 |
| 0.3 | 0.23224 |
| 0.25 | 0.22546 |
| 0.2 | 0.20547 |

| X/C | Y/C |
|---|---|
| 0.15 | 0.17996 |
| 0.1 | 0.15009 |
| 0.05 | 0.1083 |
| 0.025 | 0.07635 |
| 0.0125 | 0.05353 |
| 0 | 0.01814 |
| 0 | 0.01016 |
| 0.0125 | 0. |

\* \* \* \* \*

UNITED STATES PATENT AND TRADEMARK OFFICE
CERTIFICATE OF CORRECTION

PATENT NO. : 7,393,177 B2  
APPLICATION NO. : 11/267363  
DATED : July 1, 2008  
INVENTOR(S) : Hamid R. Rahai et al.

Page 1 of 1

It is certified that error appears in the above-identified patent and that said Letters Patent is hereby corrected as shown below:

<u>Column 3,</u>  
Line 56, delete " $x_u = x - 0.5t \sin \theta \; y_u = y + 0.5t \cos\theta$ " and insert  
-- $x_u = x - 0.5t \sin \theta \qquad y_u = y + 0.5t \cos\theta$ --.

Line 58, delete " $x_l = x + 0.5t \sin \theta \; y_l = y - 0.5t \cos\theta$" and insert  
-- $x_l = x + 0.5t \sin \theta \qquad y_l = y - 0.5t \cos\theta$ --.

<u>Column 4,</u>

Line 1, delete "$x_u = x - 0.5y_t \sin \theta \; y_u = y + 0.5y_t \cos\theta$" and insert  
-- $x_u = x - 0.5y_t \sin \theta \qquad y_u = y + 0.5 \, y_t \cos\theta$ --.

Line 3, delete "$x_l = x + 0.5 \, y_t \sin \theta \; y_l = y - 0.5y_t \cos\theta$" and insert  
-- $x_l = x + 0.5y_t \sin \theta \qquad y_l = y - 0.5y_t \cos\theta$ --.

Line 14, delete "gird" and insert -- grid --.

Signed and Sealed this

Sixteenth Day of September, 2008

JON W. DUDAS  
*Director of the United States Patent and Trademark Office*